(12) United States Patent
Barry et al.

(10) Patent No.: US 6,403,181 B1
(45) Date of Patent: *Jun. 11, 2002

(54) PREMIUM PIPE RESINS

(75) Inventors: David B. Barry, Box Hill (AU);
Vincent Joseph Crotty, Wall, NJ (US);
Brian J. Egan, Box Hill (AU); Robert I. Mink, Warren, NJ (US); Thomas Edward Nowlin, Cranbury, NJ (US); Sandra Denise Schregenberger, Neshanic, NJ (US); Kenneth George Schurzky, Bridgewater, NJ (US); Pradeep Pandurang Shirodkar, Belle Mead, NJ (US)

(73) Assignee: Mobil Oil Corporation, Fairfax, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/846,159

(22) Filed: Apr. 25, 1997

Related U.S. Application Data

(63) Continuation-in-part of application No. 08/497,991, filed on Jul. 3, 1995, now Pat. No. 5,882,750.

(51) Int. Cl.[7] .......................... C08L 23/00; F16L 11/04; F16L 11/14
(52) U.S. Cl. ...................... 428/36.9; 138/137; 138/138; 428/36.91; 428/36.92
(58) Field of Search ....................... 325/240; 428/36.91, 428/36.92, 36.9; 138/137

(56) References Cited

U.S. PATENT DOCUMENTS

| 4,937,299 | A | * | 6/1990 | Ewen et al. ................. 529/119 |
| 5,048,174 | A | | 9/1991 | McGuire ...................... 29/451 |
| 5,261,461 | A | | 11/1993 | Smith et al. ................. 138/120 |
| 5,290,498 | A | | 3/1994 | Shiraki et al. ........... 264/209.2 |
| 5,316,606 | A | | 5/1994 | Andre ........................ 156/201 |
| 5,328,210 | A | | 7/1994 | Stafford et al. ................ 285/21 |
| 5,338,589 | A | | 8/1994 | Bohm et al. ................ 428/36.9 |
| 5,417,561 | A | | 5/1995 | Shiraki et al. .............. 425/207 |
| 5,443,098 | A | | 8/1995 | Kertesz ...................... 138/109 |
| 5,494,965 | A | * | 2/1996 | Harlin et al. .................. 525/52 |
| 5,514,455 | A | * | 5/1996 | Michie, Jr. et al. ......... 428/220 |
| 5,525,678 | A | | 6/1996 | Mink et al. .................. 525/246 |
| 5,539,076 | A | | 7/1996 | Nowlin et al. ........... 526/348.1 |
| 5,582,923 | A | * | 12/1996 | Kale et al. ................... 428/523 |
| 5,773,155 | A | * | 6/1998 | Kale et al. ................... 428/523 |
| 5,882,750 | A | * | 3/1999 | Mink et al. ................ 428/35.7 |

FOREIGN PATENT DOCUMENTS

| WO | WO9702294 | 1/1997 | ............. C08F/4/64 |
| WO | 97/17136 | 5/1997 | |

OTHER PUBLICATIONS

"Reliable Pipelines with ®Hostalen CRP 100—Properties, Practical Experience and Standards", Hoechst, Jun. 1996.

\* cited by examiner

Primary Examiner—Harold Pyon
Assistant Examiner—Sandra M. Nolan

(57) ABSTRACT

The invention relates to the production of high performance conduits. The invention includes the high performance conduits, the polyethylene resin used to make them, and the process for producing the resin which produces a resin with properties which are required, in accordance with the invention to yield the performance characteristics of the resin in conduits.

The resin used in accordance with the invention exhibits a bimodal molecular weight distribution or broad molecular weight distribution and is of high molecular weight.

23 Claims, No Drawings

PREMIUM PIPE RESINS

CROSS REFERENCE TO RELATED APPLICATION

This application is a continuation in part application of Ser. No. 08/497,991 filed Jul. 3, 1995, now U.S. Pat. No. 5,882,750 which is incorporated herein by reference.

BACKGROUND OF THE INVENTION

The invention relates to premium performance polyethylene conduits, pipe, couplings and liners. High premium performance pipe is useful under conditions which impose high stress and or high service temperatures on the pipe. The conduits may be used for example in pressure or non-pressure applications in mining, gas, waste, and potable water transportation.

SUMMARY OF THE INVENTION

The invention relates to the production of high performance conduits. The invention includes the high performance conduits, the polyethylene resin used to make them, and the process for producing the resin with properties which are required to yield the performance characteristics of the subject conduits.

The resin used in accordance with the invention exhibits a bimodal molecular weight distribution or broad molecular weight distribution and is of high molecular weight. It also has a specific distribution of comonomer within the molecular weight distribution. It is produced catalytically in a single reactor.

Increasing the molecular weight of polyethylene (and copolymers of ethylene) generally results in enhancing tensile strength, ultimate elongation, impact strength, puncture resistance, and toughness, of films and conduits produced therefrom. However, increasing the molecular weight of the polyethylene will usually decrease its processability. In addition increasing the molecular weight of the molecules that incorporate the comonomer enhances the resistance of polyethylenes to slow crack growth and rupture. By providing a mixture of a high molecular weight polyethylene with a lower molecular weight polyethylene, the desirable characteristics due to the high molecular weight component can be retained while improving processability of the mixture containing the high molecular weight component. Also providing a mixture where the comonomer incorporation is controlled further enhances the performance of these materials. To produce such mixtures, various alternatives have been considered, including post reactor or melt blending, catalysis in a single reactor with a catalyst effective to produce such a product and lastly use of multistage reactors, in which diverse average molecular weight components can be produced in each reactor.

DETAILED DESCRIPTION OF THE INVENTION

The conduits of the invention can be fabricated to diameters in excess of 3 m.

The practical lower limit on diameters of conduits that can be manufactured with this invention is 2 to 3 millimeters.

Wall thickness can range from less than 1 millimeter to in excess of 60 millimeters. The practical range of wall thickness is dependent on the diameter of the conduit being manufactured. This is expressed as a ratio of the wall thickness to diameter, called the Standard Dimension Ratio; SDRs in the range seven to forty can be manufactured from this invention.

The long term performance of a pipe-grade resin can be evaluated by determining the time-to-failure under constant internal pressure (constant hoop stress), in a controlled environment.

The conduit of the invention sustains high stresses under conditions of elevated temperature. In accordance herewith, high stress performance is measured by hoop stress tests. Hoop stress measures the pipe burst resistance and the effect of internal pressure and internal pressure build-up on the conduit integrity. It is measured by immersing specimens of pipe in water baths at temperatures from 20 to 80° C., typically 20, 60 and 80° C. These specimens are then pressured to induce a hoop stress [hoop stress (MPa)=P (Dm−Wmin)/2 Wmin, where Wmin is the minimum pipe wall thickness in millimeters, Dm is the mean pipe outside diameter in millimeters, P is the applied pressure in megapascals in the pipe]. Typically in excess of 25 specimens are tested at each test temperature. The time to failure of each specimen is measured. The longer the life at a given hoop stress and temperature the better the performance of the material. This analysis methodology is well documented in International and National Standards, such as ISO 4437, ISO 4427, AS 4131, AS4130, ASTM D2837, and the standard method for the analysis and prediction of pipe performance as given in ISO/TR 9080 and similar publications.

Given the long lifetimes required of high performance pipe, hoop stress testing is often conducted at an elevated test temperature, such as 80° C. The time-to-failure under constant internal pressure (constant hoop stress) at 80° C. can be used as a measure of performance. At a test temperature of 80° C. and a hoop stress of 5.0 MPa, the conduits of the invention exhibit a life-time in excess of 1000 hours, preferably greater than 2500 hours, most preferably greater than 4000 hours.

Resistance to impact failure is an equally important aspect of pipe performance. This was assessed by the Charpy impact test, using an instrumented impacter. Specimen dimensions were 10 mm×30 mm×160 mm, and the specimens were pre-notched with a notch to width ratio in the range of 0.2 to 0.6. Test temperatures ranged from −60° C. to +60° C. The span to width ratio of the impacter was 4. The critical strain energy release rate for failure, Gc, was calculated using the principles of linear elastic fracture mechanics. The material characteristic Gc is determined using the specimens described above. The specimen notches vary from 3 to 15 millimeters in length, generally notches of 3, 6, 9, 12, and 15 millimeters are used. At a given notch depth at least three samples are tested. The samples are held at the test temperature for two hours prior to testing. Each specimen is then placed in the instrumented impact tester and impacted. The impact tester determines the force displacement curve for the impact. These data are used to determine the energy for fracture, from the area under the force displacement curve. At a given temperature the fracture energies are plotted as a function of the notched specimen dimensions multiplied by a testing geometry factor. This plot is generally linear. The value of Gc for the material, at the temperature of interest, is the slope of the line. (Ref: J. G. Williams, Fracture Mechanics of Polymers, Ellis Horwood, Chichester, 1984.)

Conduits should be resistant to slow crack growth [Refs: ISO 4437, slow crack growth test, and D. Barry and O. Delatycki, J. Polym. Sci., B, Polym. Phys., 25, 883 (1987)] This property is measured in part by the hoop stress-life time testing cited above; however specific testing is often carried out to determine the resistance to slow crack growth. Resistance to slow crack grow was assessed using the PENT test.

This test is described in ASTM 1473-94. Testing is carried out at 80° C., and an initial tensile stress of 2.2 MPa (megapascals). The PENT test measures the time to failure of a 25×10 mm specimen which has a 3 mm sharp notch across one of its broad faces and 1 mm notches across both of its narrow faces. The specimen is tested at a constant load, and this load induces an initial tensile stress of 2.2 MPa in the specimen. Conduits of the invention exhibit PENT life times in the range of greater then 50 hours preferably greater than 100 hours, most preferably greater than 150 hours.

The conduits of the invention are produced on conventional pipe extrusion or pipe winding equipment. One of the advantages of this invention is that conduits with superior performance can be manufactured using conventional equipment. This is in part due to the ease of processing that the invention imparts due to the mixture of a low molecular weight and high molecular weight components. The processability of these materials is assessed using capillary rheometry. A capillary rheometer measures the apparent viscosity of the material at a given temperature and apparent shear rate. Conduits of the invention, exhibit in the molten state a lower apparent viscosity at a given apparent shear rate than a conventional unimodal PE pipe resin of similar melt flow index, FI at 190° C.

The polyethylene resin of the invention is made with a bimetallic catalyst, in a single reactor, and exhibits a bimodal or broad molecular weight distribution. That is the polyethylene can be characterized as comprising at least two different polymer components which differ from each other in molecular weight. One of the polymer components has a higher molecular weight (HMW) compared to the other component of relatively lower molecular weight (LMW).

The polyethylene resin of the invention, for use in pipe production to make high performance pipe, with the impact resistance, processing advantages, resistance to slow crack growth, and hoop stress performance characteristics identified above, must satisfy four physical properties, which relate to density, FI [or $I_{21}$ measured accordingly to ASTM D-1238, Condition E], the calculated weight fraction of the high molecular weight component, and calculated MI of the low molecular weight component. A brief description of the mathematical technique that is used to estimate the composition (molecular weight and weight fraction) of the bimodal molecular weight distribution appears in Computer Applications in Applied Polymer Science, ACS Symposium Series, 197, T. Provder, 45, 1982, which is expressly incorporated herein by reference. The MI of the low molecular weight component is estimated from a suitable calibration curve based on measured MIs and molecular weights of low molecular weight polyethylenes. In particular, the resins satisfy a density requirement in the range of 0.930 to 0.960 g/cc, preferably 0.935 to 0.955 g/cc, most preferably 0.940 to 0.950 g/cc. Also, the resins satisfy a FI requirement in the range of 2 to 20 dg/min., preferably 2 to 10 dg/min., most preferably 3 to 8 dg/min. Moreover, the resin must exhibit a weight fraction of the high molecular weight component, based on resin weight, of 0.20 to 0.90, preferably 0.50 to 0.80, most preferably 0.55 to 0.75. In addition, the low molecular weight component must exhibit a calculated MI of 200 to 10000 dg/min., preferably 200 to 5000 dg/min., most preferably 200 to 3000 dg/min.

The resin of this invention may be either 1) a homopolymer of ethylene; 2) at least one copolymer of a preponderance i.e., greater than 50 wt. % of ethylene with a minor amount of a 1-olefin containing 3 to about 10 carbon atoms, preferably a 1-olefin containing 4 to about 10 carbon atoms, e.g., 1-butene, 1-pentene, 1-hexene, 4-methyl-1-pentene, 1-octene, 1-decene, and mixtures thereof; or 3) a mixture of any of the foregoing polymers. In general, the polymer product will comprise an amount of polymerized comonomer which is in the range, for example, of about 0 to 30 weight percent, based on the total weight of polymer.

The resins of the invention comprise a HMW component and a LMW component with a HMW component weight fraction which is greater than 0 (zero). The resin has a molecular weight distribution, which is characterized as MFR or $M_w/M_n$. The MFR of resin products of the invention can range from 20 to 300, preferably from 40 to 200, and most preferably from 50 to 150. The $M_w/M_n$ of resin products of the invention can range from 2.5 to 60, preferably from 5 to 40, and most preferably from 10 to 30.

The compositions of the invention can be extruded into pipes and injection or blow molded into articles or extruded and blown into films. Films can be produced which are 0.2 to 10.0 mils, preferably 0.5 to 2.0 mils, thickness. Blow molded articles include bottles, containers, fuel tanks and drums.

The polyethylene resins of the invention need not be blended with other polyolefins, e.g., polyethylenes and ethylene copolymers. However, it is contemplated that the resins may be blended with other polyolefins and copolymers of e.g. ethylene such as LLPPE. Thus, the invention contemplates a composition for pipe production comprising greater than 80% by weight of the bimodal or broad molecular weight distribution polyethylene resin.

The products may contain any of various additives conventionally added to polymer compositions such as lubricants, stabilizer, antioxidants, compatibilizers, pigments, etc. These reagents can be employed to stabilize the products against degradation. For example, additive packages comprising 400–2000 ppmw hindered phenol(s); 200–2000 ppmw phosphites; 250–3000 ppmw stearates, and 0.5 to 3.0 wt. % carbon black, for addition to the resin powders, can be used for pelletization.

The following Examples further illustrate the essential features of the invention.

However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - a plaque is made and conditioned for one hour at 100 C. to approach equilibrium crystallinity. Measurement for density is then made in a density gradient column; reported as gms/cc. |
| Melt Index (MI), $I_2$ | ASTM D-1238 - (190° C./2160 g) Measured at 190° C. - reported as grams per 10 minutes. |
| High Load Melt Index (HLMI), $I_{2.16}$ or FI | ASTM D-1238 - (190° C./21600 g) Measured at 10 times the weight used in the melt index test above. |
| Melt Flow Ratio | $I_{21}/I_2$ |
| It is noted that $I_{21.6}$ and $I_{21}$ are used interchangeably herein. | |

When the resin is made with the preferred catalyst described below it will contain 0.5 to 20 ppm of transition metals. In particularly preferred embodiments described herein the resin will contain 0.1 to 10 ppm Zr and 0.5 to 10 ppm Ti. The as formed reactor product is granular and has a preferred average particle size range of 0.01–0.04 inches.

The result of the process conducted in the fluidized bed gas phase reactor is a particulate resin product. Particles of this resin exhibit very uniform molecular weight and molecular weight distribution. This uniformity is attributable to a catalyst which contains the two transition metals. Production of bimodal molecular weight or broad molecular weight distribution resins by altering process conditions in two reactors in series does not allow for this uniformity. In a preferred embodiment, the invention relates to the production of titanium/zirconium-based bimetallic catalyst systems that produce broad and/or bimodal MWD polyethylene resins in a single reactor. In the most preferred embodiment, the LMW component in the resin is produced by the Zr active centers, while the HMW component is produced by the Ti active centers. The relative productivity of the two active centers determines the ratio of the HMW and the LMW components in the final resin.

The Catalyst

In accordance with the invention, these catalysts are made by a process for forming a carrier material impregnated with alumoxane and derivatives thereof comprising the steps (1) providing silica which is porous and has a particle size of 1 to 250 microns, having pores which have an average diameter of 50 to 500 Angstroms and having a pore volume of 0.5 to 5.0 cc/g (2) slurrying the silica in an aliphatic medium;

(3) providing a volume of a solution comprising a metallocene, alumoxane of formulas R—(Al(R)—O—)$_x$—AlR$_2$ for oligomeric linear alumoxanes and (—Al(R)—O—)$_y$ for cyclic alumoxanes wherein x is 1–40, y is 3–40, and R is a $C_1$–$C_8$ alkyl group in an aromatic solvent, wherein the concentration of alumoxane, expressed as Al weight percent is 1 to 20; and wherein the volume of the solution is sufficient to impregnate the pores of silica without forming a slurry of the silica in the aromatic solvent.

(4) contacting the silica with said volume of said solution (3);

(5) evaporating liquid phase from the impregnated silica to recover dry free-flowing catalyst particles.

The metallocene complex becomes more uniformly distributed throughout the support as a result of steps (2) and (4). When two transition metal sources exhibiting different hydrogen responses in ethylene polymerization reactions are supported on the carrier subjected to the process of the invention, the result of the catalyst preparation process is an olefin polymerization catalyst composition which produces less gels in the polyethylene film produced from the polyethylene prepared with the catalyst composition. In the process of the invention, step (2) may be undertaken prior to or after step (4).

The carrier material is a solid, particulate, porous, preferably inorganic material, such as an oxide of silicon and/or of aluminum. The carrier material is used in the form of a dry powder having an average particle size of from about 1 micron to about 500 microns, preferably from about 10 microns to about 250 microns. The surface area of the carrier is at least about 3 square meters per gram ($m^2/g$), and preferably at least about 50 $m^2/g$ up to about 350 $m^2/g$. The carrier material should be free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl (OH) groups to produce the catalyst composition of this invention.

In the most preferred embodiment, the carrier is silica which, prior to the use thereof in the first catalyst synthesis step, has been dehydrated by fluidizing it with nitrogen and heating at about 600° C. for about 4–16 hours to achieve a surface hydroxyl group concentration of about 0.7 mmol/g. The silica of the most preferred embodiment is a high surface area, amorphous silica (surface area=300 $m^2/g$; pore volume of about 1.65 $cm^3/g$), and it is a material marketed under the tradenames of Davison 952 or Davison 955 by the Davison Chemical Division of W. R. Grace and Company or Crosfield ES70 by Crosfield Limited. The silica is in the form of spherical particles and obtained by the spray-drying process. As procured, these silicas are not calcined; and this must be dehydrated, as indicated above.

The catalyst synthesis is undertaken under inert conditions in the absence of water and oxygen.

The carrier material having said OH groups is slurried in a non-polar solvent. The slurry of the carrier material is prepared by introducing the carrier into the solvent, preferably while stirring, and heating the mixture to about 25 to about 70° C., preferably to about 40 to about 60° C. Temperature of the slurry is critical with respect to the activity of the catalyst components added to it. All catalyst precursor synthesis steps should be conducted at temperatures below 90° C.

In embodiments of the invention, incorporation of the first transition metal component in the catalyst occurs prior to undertaking steps (3) and (4). In specific embodiments, incorporation of the first transition metal component involves a series of steps. Initially, the carrier is contacted with an organomagnesium compound which has the empirical formula $R_mMgR'_n$ where R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is equal to the valence of Mg. Optionally, but preferably, the organomagnesium-impregnated carrier is thereafter contacted with an alcohol and lastly with a non-metallocene transition metal source. Most preferably, these steps are undertaken in the order noted and without isolation of a dry product until after the non-metallocene transition metal compound incorporation.

Suitable non-polar solvents for slurrying silica and introduction of the first transition metal component are materials which are liquid at reaction temperatures and in which all of the reactants used herein, i.e., the organomagnesium compound, the alcohol and the transition metal compound, are at least partially soluble. Preferred non-polar solvents are alkanes, such as isopentane, hexane, isohexane, n-heptane, octane, nonane, and decane, although a variety of other materials including cycloalkanes, such as cyclohexane, aromatics, such as benzene, toluene and ethylbenzene, may also be employed. The most preferred non-polar solvents are isopentane and isohexane. Prior to use, the non-polar solvent should be purified, such as by percolation through silica gel and/or molecular sieves, to remove traces of water, oxygen, polar compounds, and other materials capable of adversely affecting catalyst activity. In certain embodiments of the invention, two aliphatic solvents may be used, one for the incorporation of the non-metallocene transition metal compound and second aliphatic solvent for use in the incorporation of the metallocene transition metal compound dissolved in an aromatic solvent. Accordingly, in the embodiment of titanium incorporation into the silica with the aliphatic solvent, that solvent will be referred as the first aliphatic solvent; and when an aliphatic solvent is used in conjunction with metallocene compound incorporation into the support, that aliphatic solvent will be referred as the second aliphatic solvent.

In the most preferred embodiment of the synthesis of this catalyst it is important to add only such an amount of the organomagnesium compound to the silica slurry that will be deposited, physically or chemically, into the support since any excess of the organomagnesium compound in the solution may react with the other synthesis chemicals and precipitate outside of the support. The carrier drying temperature affects the number of sites on the carrier available for the organomagnesium compound: the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited into the support without leaving any excess of the organomagnesium compound in the solution. Thus, the molar ratios given below are intended only as an approximate guideline and the exact amount of the organomagnesium compound in this embodiment must be controlled by the functional limitation discussed above, i.e., it must not be greater than that which can be deposited into the support. The required amount of the organomagnesium compound can be determined in any conventional manner, e.g., by adding the organomagnesium compound to the slurry of the carrier in the solvent, while stirring the slurry, until the organomagnesium compound is detected in the liquid phase.

For example, for the silica carrier heated at about 600° C., the amount of the organomagnesium compound added to the slurry is such that the molar ratio of Mg to the hydroxyl groups (OH) on the solid carrier is about 0.5:1 to about 4:1, preferably about 0.8:1 to about 3:1, more preferably about 0.9:1 to about 2:1 and most preferably about 1:1. The organomagnesium compound dissolves in the non-polar solvent to form a solution from which the organomagnesium compound is deposited into the carrier. The amount of the organomagnesium compound based on the amount of silica ranges from 0.2 mmol/g to 2 mmol/g, preferably from 0.4 mmol/g to 1.5 mmol/g, more preferably from 0.6 mmol/g to 1.0 mmol/g, and most preferably from 0.7 mmol/g to 0.9 mmol/g.

It is also possible to add the organomagnesium compound in excess of the amount deposited into the support and then remove it, e.g., by filtration and washing. However, this alternative is less desirable than the most preferred embodiment described above.

The organomagnesium compound-treated support is contacted with an organic alcohol (ROH) containing RO groups which displace alkyl groups attached to the magnesium atom. The amount of the alcohol is effective to provide a ROH:Mg [mol/mol] ratio which ranges from 0.2 to 1.5, preferably from 0.4 to 1.2, more preferably from 0.6 to 1.1, most preferably from 0.9 to 1.0.

Contact of the silica-supported magnesium compound with the alcohol is also undertaken in the slurry at a temperature ranging from 25° C. to 80° C., preferably at 40° C. to 70° C.

The alkyl group in the alcohol can contain 1 to 12 carbon atoms, preferably 1 to 8; in the embodiments below, it is an alkyl group containing 2 to 4 carbon atoms, particularly four carbon atoms (n-butanol). The inclusion of the alcohol addition step in the catalyst synthesis of the invention produces a final catalyst which is much more active, requires much less non-metallocene transition metal compound (e.g., or titanium compound) and is much more active with respect to the metallocene complex, as opposed to exclusion of the alcohol addition step.

After the addition of the alcohol to the slurry is completed, the slurry is contacted with the first source of transition metal compound, a preferably non-metallocene transition metal compound. The slurry temperature at this stage must be maintained at about 25 to about 70° C., preferably to about 40 to about 60° C., because temperatures above 80° C. can result in deactivation of the non-metallocene transition metal component. Suitable non-metallocene transition metal compounds used herein are compounds of metals of Groups 4A, and 5A, of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride, vanadium tetrachloride, vanadium oxytrichloride, titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is $TiCl_4$. The amount of titanium or vanadium ranges from a Ti/Mg molar ratio of 0.1 to 2.0, preferably from 0.3 to 1.0.

Mixtures of such transition metal compounds may also be used and generally no restrictions are imposed on the transition metal compounds which may be included. Any transition metal compound that may be used alone may also be used in conjunction with other transition metal compounds. After the addition of the first transition metal compound is completed, the solvent is removed by evaporation or filtering to obtain a free-flowing powder of the catalyst intermediate. Next, incorporation of the metallocene transition metal compound into the catalyst intermediate is undertaken. The metallocene compound is pre-activated with an alkyl alumoxane.

Incorporation of the metallocene complex and its uniform distribution in the support is achieved in a mixed solvent system.

The metallocene compound has the formula $Cp_xMA_yB_z$ in which Cp is an unsubstituted or substituted cyclopentadienyl group, M is zirconium or hafnium atom and A and B belong to the group including a halogen atom, hydrogen atom or an alkyl group. In the above formula of the metallocene compound, the preferred transition metal atom M is zirconium. In the above formula of the metallocene compound, the Cp group is an unsubstituted, a mono- or a polysubstituted cyclopentadienyl group: and x is at least 1. The substituents on the cyclopentadienyl group can be preferably straight-chain $C_1-C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when x in the above formula of the metallocene compound is equal to 2, the cyclopentadienyl groups can be also bridged by polymethylene or dialkylsilyl groups, such as —$CH_2$—, —$CH_2$-$CH_2$—, —CR'R"— and —CR'R"—CR'R"— where R' and R" are short alkyl groups or hydrogen atoms, —Si$(CH_3)_2$—, —Si$(CH_3)_2$—$CH_2$-$CH_2$—Si$(CH_3)_2$— and similar bridge groups. If the A and B substituents in the above formula of the metallocene compound are halogen atoms, they belong to the group of fluorine, chlorine, bromine or iodine; and y+z is 3 or less, provided that x+y+z equals the valence of M. If the substituents A and B in the above formula of the metallocene compound are alkyl groups, they are preferably straight-chain or branched $C_1$–$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides w-herein the metal is a zirconium or hafnium atom, halide groups are preferably chlorine atoms and the alkyl groups are $C_1$–$C_6$ alkyls. Illustrative, but non-limiting examples of metallocenes include Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium
Ethylenebis(indenyl)diphenylzirconium,
Ethylenebis(indenyl)methylzirconium chloride,
Ethylenebis(indenyl)zirconium bis(methanesulfonate),
Ethylenebis(indenyl)zirconium bis(ptoluenesulfonate),
Ethylenebis(indenyl)zirconium bis(trifluoromethanesulfonate),
Ethylenebis(4,5,6,7 tetrahydroindenyl)zirconium dichloride,
Isopropylidene(cyclopentadienyl)(fluorenyl)zirconium dichloride,
Isopropylidene(cyclopentadienyl)(methylcyclopentadienyl) zirconium dichloride,
Dimethylsilylbis(cyclopentadienyl)zirconium dichloride,
Dimethylsilylbis(methylcyclopentadienyl)zirconium dichloride,
Dimethylsilylbis(dimethylcyclopentadienyl)zirconium dichloride,
Dimethylsilylbis(trimethylcyclopentadienyl)zirconium dichloride,
Dimethylsilylbis(indenyl)zirconium dichloride,
Dimethylsilylbis(indenyl)zirconium bis(trifluoromethanesulfonate),
Dimethylsilylbis(4,5,6,7-tetrahydroindenyl)zirconium dichloride,
Dimethylsilyl(cyclopentadienyl)(fluorenyl)zirconium dichloride,
Diphenylsilylbis(indenyl)zirconium dichloride,
Methylphenylsilylbis(indenyl)zirconium dichloride,
Bis(cyclopentadienyl)zirconium dichloride,
Bis(cyclopentadienyl)zirconium dibromide,
Bis(cyclopentadienyl)methylzirconium chloride,
Bis(cyclopentadienyl)ethylzirconium chloride,
Bis(cyclopentadienyl)cyclohexylzirconium chloride,
Bis(cyclopentadienyl)phenylzirconium chloride,
Bis(cyclopentadienyl)benzylzirconium chloride,
Bis(cyclopentadienyl)zirconium chloride monohydride,
Bis(cyclopentadienyl)hafnium monochloride monohydride,
Bis(cyclopentadienyl)methylzirconium hydride,
Bis(cyclopentadienyl)dimethylzirconium,
Bis(cyclopentadienyl)dimethylhafnium,
Bis(cyclopentadienyl)diphenylzirconium,
Bis(cyclopentadienyl)dibenzylzirconium,
Bis(cyclopentadienyl)methoxyzirconium chloride
Bis(cyclopentadienyl)ethoxyzirconium chloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)ethoxyzirconium chloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(butylcyclopentadienyl)hafnium dichloride
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(pentamethylcyclopentadienyl)zirconium dichloride,
Bis(hexylcyclopentadienyl)zirconium dichloride,
Bis(trimethylsilylcyclopentadienyl)zirconium dichloride,
Bis(n-butylcyclopentadienyl)hafnium monochloride monohydride,
Bis(n-butylcyclopentadienyl)zirconium monochloride monohydride.

The metallocene compounds utilized within the embodiment of this art can be used as crystalline solids or solutions in hydrocarbons.

Alumoxanes activate metallocene transition metal compounds. The class of alumoxanes comprises oligomeric linear and/or cyclic alkylalumoxanes represented by the formula: R—(Al(R)—O)$_n$—AlR$_2$ for oligomeric linear alumoxanes and (—Al(R)—O—)$_m$ for oligomeric cyclic alumoxanes wherein n is 1–40, preferably 10–20, m is 3–40, preferably 3–20 and R is a $C_1$–$C_8$ alkyl group, preferably methyl group. MAO (methylalumoxane)is a mixture of oligomers with a very wide distribution of molecular weights and usually with an average molecular weight of about 1200. MAO is typically kept in solution in toluene. In one embodiment, the amount of Al, provided by alumoxane, is sufficient to provide an Al:transition metal (provided by metallocene) molar ratio ranging from 50 to 500, preferably 75 to 300, more preferably from 85 to 200, and most preferably from 90 to 150.

In accordance with the invention, deposition of the metallocene complex admixed with alumoxane into the carrier is undertaken using the free-flowing powder containing a non-metallocene transition metal compound impregnated into the carrier. The free-flowing powder is pre-slurried in a light aliphatic solvent. The pore volume of the carrier is determined and metallocene-alumoxane solution is provided in a volume equal to or less than two times the total pore volume of the carrier.

The volume of the solution comprising the alumoxane, the metallocene complex and the aromatic solvent therefore can vary. In the preferred embodiment, the volume of the solution comprising the solvent and metallocene-alumoxane ingredients is lower than that necessary to form a slurry of the carrier material, such as silica, but sufficient to fill the pores of the carrier material. Accordingly and preferably, the maximum volume of the alumoxane-metallocene solution does not exceed two times the total pore volume of the carrier material. Accordingly, if the pore volume of the carrier material is 1.65 cm$^3$/g, then the volume of alumoxane-metallocene solution will be equal to or less than 3.30 cm$^3$/gram of carrier material.

The solvent used to form this solution is one in which each of the metallocene, alumoxane, and activated mixtures thereof are soluble. Preferably, this solvent is an aromatic solvent selected from the group consisting of benzene, xylene or toluene. The most preferred solvent is toluene.

As indicated above, incorporation and uniform dispersion of the metallocene complex in the carrier involves a system consisting of at least two solvents. In accordance with the invention, the first solvent used during the addition of RMgR', ROH and TiX$_4$ to silica, to form a Ziegler type catalyst intermediate is preferably aliphatic; it may consist of straight or branched chain hydrocarbons with 4 to 7 carbon atoms. Examples include isobutane, pentane, isopentane, hexane, isohexanes, heptane, isoheptanes.

The second aliphatic solvent is used to slurry the catalyst intermediate and to receive or to disperse the solution containing the source of metallocene compound in an aromatic solvent.

The liquid medium in the final step of catalyst preparation comprises a volume ratio of the aliphatic solvent to the aromatic solvent which ranges from to 0.5 to 30. The slurry is agitated to insure good mixing while the solution of metallocene compound and alumoxane is added to the slurry of the carrier material.

The liquid phase is evaporated from the slurry to isolate a free-flowing powder containing two sources of transition metal without any filtering. Filtering is avoided to substantially eliminate the loss of catalytic components. The liquid phase is removed by evaporation at relatively low temperatures, in the range above 40° C. and below about 50° C. Very short heating time schedules are employed to obviate catalyst degradation.

In a preferred embodiment, the metallocene is added to the solution of the alumoxane prior to impregnating the carrier with the solution. Again, as noted above, the maximum volume of the alumoxane solution also including the metallocene compound should not exceed two times the total pore volume of the carrier material. The molar ratio of alumoxane, expressed as Al, to metallocene metal expressed as M (e.g. Zr), ranges from 50 to 500, preferably 75 to 300, and most preferably 90 to 150. An added advantage of the present invention is that this Al:Zr ratio can be directly controlled. In a preferred embodiment the alumoxane and metallocene compound are mixed together at a temperature of about 20 to 80° C., for 0.1 to 24 hours, prior to use in the deposition step. The solvent for the metallocene compound and alumoxane can be hydrocarbons or halogenated aromatic hydrocarbons, preferably it is toluene.

The catalyst precursor component formed from the organomagnesium compound, the non-metallocene transition metal compound and the activated metallocene complex, must be activated with a cocatalyst, which is an alkylaluminum compound. Preferably, trimethylaluminum (TMA) is the cocatalyst. The amount of TMA is sufficient to give an Al:Ti molar ratio of about 1:1 to about 1000:1, preferably about 5:1 to about 300:1, and most preferably about 5:1 to about 100:1. The activated catalyst composition exhibits high activity for long periods of time and shows little deactivation.

Olefins are polymerized with catalysts according to the present invention by any suitable process. Such processes include polymerization carried out in suspension, in solution or in the gas phase. Gas phase polymerization reactions are preferred, e.g., those taking place in stirred bed reactors and, especially, fluidized bed reactors. The polymerization is carried out at relatively low temperatures, e.g. from about 30° to about 115° C. Preferably, polymerization pressures are less than 10,000 psi, preferably less than 1000 psi, and most preferably in the range of 100 to 350 psi.

A particularly desirable method for producing polyethylene polymers according to the present invention is in a fluid-bed reactor. Such a reactor and means for operating it are described by Nowlin et al., U.S. Pat. No. 4,481,301, the entire contents of which are incorporated herein by reference. The polymer produced in such a reactor contains the catalyst particles because the catalyst is not separated from the polymer. The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

When a fluid-bed reactor is employed, the catalyst modifier of the invention can be introduced separately. The catalyst modifier is water. The amount of the catalyst modifier can range from 0.1 to 1000 ppm (based on ethylene), and preferably from 0.1 to 50 ppm (based on ethylene). The water cofeed can range from 0.1 ppm to 1000 ppm based on ethylene; generally 0.1 to 50 ppm water, based on ethylene, is employed. Although the catalyst modifier can be added separately, it can also be added as a mixture, a cofeed, with ethylene or hydrogen.

EXAMPLES

Example 1

U.S. Ser. No. 08/555816 filed Nov. 9, 1995 describe procedures for producing the catalyst used to make the resin of the invention.

Titanium component: Into a 200 gallon mix vessel containing a helical stirrer was added Davison-grade 955 silica (61.0 lb), which was previously calcined at 600° C. for 4 h, and isopentane (138 liter). The agitator speed was set at 100 rpm and the internal temperature of the vessel was set at 50–55° C. Dibutylmagnesium solution in heptane (19.90 mol) was added to the stirred silica/isopentane slurry and stirring was continued for one hour. 1-Butanol (18.91 mol) was added to the slurry and stirring was continued for 1 h. Then, TiCl$_4$ (11.94 mol) was added to the reaction medium and stirring was continued for 1 h. Then the agitator speed was reduced to 40 rpm and the liquid phase was removed by evaporation under a nitrogen purge to provide a free-flowing light tan powder. Elemental analyses: Ti, 1.66 wt %; Mg, 1.36 wt %.

Bimetallic Catalyst: The dry titanium component from above (393.5 g) was placed into a 2-gallon glass vessel containing a helical stirrer which was set at 150 rpm. About 1970 ml of isopentane was added to the glass vessel. Then, at ambient temperature was added a toluene solution (629 ml) containing MAO (7.00 mmol Al/g titanium component) and (n-BuCp)$_2$ZrCl$_2$ (7.42 g) over a period of about 15 minutes. After one hour, the internal temperature was increased to about 45° C. and the liquid phase was removed under a nitrogen purge for 5 h to provide a brown free-flowing powder. Elemental analyses: Ti, 1.02 wt %; Zr, 0.27 wt %. The catalyst for run #6 in the Table at page 22 was prepared in the foregoing synthesis. The other catalysts were prepared by similar synthesis but for variation in the loading and Al:Zr ratio.

Example 2

We produced a series of resins in a gas phase reactor using catalysts that were prepared as described in example 1. The process conditions, resin characteristics, catalyst composition and the pipe performance are tabulated in the attached table. For comparison we have also included pipe resins available commercially from Kemcor Australia Proprietary Limited (HD2468 and MD0898). The invention pipe resins provide superior performance as indicated by longer failure times and higher impact strength.

polyethylene resin prepared in the presence of a supported bimetallic polymerization catalyst comprising a metallocene component, the metallocene component comprising a transition metal, and a non-metallocene component, the non-metallocene component comprising a transition metal, the polyethylene resin comprising at least two components which differ from each other in average molecular weight, one component of the at least two components exhibiting a higher average molecular weight than a second of the two components, the second component exhibiting a lower average molecular weight than the one component, the polyethylene resin having a High Load Melt Index (FI) as measured according to ASTM D 1238, Condition F, at 190° C. and a load of 21,600 g, of 2 to 20 dg/min and containing a residue of the bimetallic catalyst in an amount which results in up to 20 ppm of the transition metals provided by the bimetallic catalyst residue in the resin.

2. The conduit of claim 1, wherein the resin contains 0.1 to 10 ppm zirconium.

3. The conduit of claim 1, wherein said life time is greater than 500 hours.

4. The conduit of claim 3, wherein said life time is greater than 1000 hours.

| | 1 | 2 | 3 | 4 | 5 | 6 | 7 | 8 | 9 | HD2468 (Kemcor) | MD0898 (Kemcor) |
|---|---|---|---|---|---|---|---|---|---|---|---|
| RESIN PROPERTIES | | | | | | | | | | | |
| Fl (dg/min) | 4.6 | 5.4 | 3.9 | 4.2 | 4.9 | 3.5 | 7.2 | 5.6 | 6.5 | 14 | 13 |
| Density (g/cc) | 0.946 | 0.947 | 0.946 | 0.944 | 0.944 | 0.946 | 0.947 | 0.949 | 0.952 | 0.947 | 0.942 |
| Xhmw | 0.64 | 0.64 | 0.69 | 0.72 | 0.67 | 0.67 | 0.61 | 0.63 | 0.65 | N/A | N/A |
| Mllmw(dg/min) | 1050 | 1700 | 2450 | 1750 | 1850 | 1000 | 1250 | 2550 | 1750 | N/A | N/A |
| Zr residue (ppm) | * | 1.06 | 1.16 | 1.09 | .91 | 1.41 | 1.63 | * | 1.16 | N/A | N/A |
| PIPE PROPERTIES | | | | | | | | | | | |
| Time-to-fail (hrs) | 1650 | 2835 | >4075 | >5280 | >1300 | 3595 | 3080 | 840 | 235 | 400 | 600 |
| Impact, G$_c$ (kJ/m$^2$) | 17 | * | * | * | * | * | * | 16 | * | 6 | 5 |
| REACTOR CONDITIONS | | | | | | | | | | | |
| Reactor T (C) | 95 | 95 | 95 | 95 | 95 | 90 | 98 | 90 | 94 | | |
| Ethylene PP (PSI) | 173 | 184 | 182 | 174 | 174 | 183 | 190 | 188 | 171 | | |
| Isopentane PP (PSI) | 34 | 33 | 33 | 34 | 2 | 41 | 24 | 32 | 37 | | |
| C$_6$:C$_2$ Feed Wt. Ratio | 0.025 | 0.032 | 0.031 | 0.037 | 0.032 | 0.025 | 0.030 | ~0.018 | 0.014 | | |
| H$_2$:C$_2$ Molar Ratio | 0.010 | 0.0074 | 0.0080 | 0.0107 | 0.0075 | 0.0103 | 0.0070 | 0.0095 | 0.0096 | | |
| TMA feed (ppmw) | 126 | 90 | 98 | 127 | 127 | 129 | 173 | ~123 | 124 | | |
| Water Feed (ppmv) | 6.3 | 19.7 | 19.3 | 9.1 | 14.2 | 0 | 2.1 | ~3 | 18.3 | | |
| CATALYST COMPOSITION | | | | | | | | | | | |
| Al:Zr molar ratio | 100 | 120 | 120 | 120 | 120 | 150 | 100 | 100 | | 120 | |
| MAO loading (mmol Al from MAO/g Ti component) | 6 | 6 | 6 | 6 | 6.8 | 7 | 6 | 6 | | 6.8 | |

(* indicates property not measured for this sample)

Extended hoop stress testing of sample 1 from example 2 has been conducted at 20, 60 and 80° C. The data was analyzed according to ISO TR 9080. This analysis indicated that example 2, sample 1, would sustain a design hoop stress, $\sigma_{lci}$, of 6.1 MPa at 50° C. for 50 years. This compares to performances of 1 year at 6.7 Mpa for HD2468 and 28 years at 6.7 for MD0898, both at 50° C.

What is claimed is:

1. A conduit having a diameter of at least about 2 mm which exhibits a life time of at least 100 hours at a hoop stress of 5 megapascal (MPa) at 80° C. and an impact strength of greater than 3 kJ/m$^2$ at 0° C. and comprising greater than 80% by weight of polyethylene resin selected from polymers of ethylene; copolymers of ethylene; and mixtures of said polymers and copolymers of ethylene; the 5. The conduit of claim 1, wherein said impact strength is greater than 5 kJ/m$^2$ at 0° C.

6. The conduit of claim 1, wherein said impact strength is greater than 10 kJ/m$^2$ at 0° C.

7. The conduit of claim 1, wherein the polyethylene resin exhibits a density of 0.930 to 0.96 g/cc.

8. The conduit of claim 1, wherein said second component exhibits a calculated Melt Index (MI) as measured according to ASTM D 1238, Condition E, at 190° C. and a load of 2,160 g, of 200 to 10,000 dg./min.

9. The conduit of claim 1, which is characterized by a time to failure when PENT tested, in accordance with ASTM 1473-94, at 80° C. and an initial tensile stress of 2.2 MPa, of greater than 50 hours.

10. The conduit of claim 1, wherein said one component is present in the resin as a calculated weight fraction in the range of 0.20 to 0.90.

11. The conduit of claim 10, wherein said one component is present in the resin as a calculated weight fraction in the range of 0.50 to 0.80.

12. The conduit of claim 11, wherein said one component is present in the resin as a calculated weight fraction in the range of 0.55 to 0.75.

13. The conduit of claim 12, wherein the resin exhibits a density of 0.930 to 0.96 g/cc.

14. The conduit of claim 12, wherein the resin exhibits a density of 0.935 to 0.955 g/cc.

15. The conduit of claim 12, wherein the resin exhibits a density of 0.940 to 0.950 g/cc.

16. The conduit of claim 14, wherein said second component exhibits a calculated Melt Index (MI) as measured according to ASTM D 1238, Condition E, at 190° C. and a load of 2,160 g, of 200 to 10,000 dg./min.

17. The conduit of claim 15, wherein said one component is present in the resin as a calculated weight fraction in the range of 0.20 to 0.90.

18. The conduit of claim 15, wherein said one component is present in the resin as a calculated weight fraction in the range of 0.50 to 0.80.

19. The conduit of claim 15, wherein said one component is present in the resin as a calculated weight fraction in the range of 0.55 to 0.75.

20. The conduit of claim 19, wherein the resin exhibits a density of 0.935 to 0.955 g/cc.

21. The conduit of claim 19, wherein the resin exhibits a density of 0.940 to 0.950 g/cc.

22. The conduit of claim 1, wherein the polyethylene resin is prepared in a single reactor.

23. A conduit having a diameter of at least about 2 mm and comprising greater than 80% by weight of a polyethylene resin selected from the group consisting of polymers and copolymers of ethylene and admixtures thereof, wherein the resin exhibits a High Load Melt Index (FI) as measured according to ASTM D 1238, Condition F, at 190° C. and a load of 21,600 g, of 2 to 20 dg/min, wherein the polyethylene resin is produced in one reactor and comprises at least two components which differ from each other in average molecular weight, one component of the at least two components exhibiting a higher average molecular weight than a second of the two components, the second component exhibiting a lower average molecular weight than the one component, wherein said one component is present in the resin as a calculated weight fraction in the range of 0.50 to 0.80, wherein the polyethylene resin exhibits a density of 0.935 to 0.955 g/cc, and wherein the polyethylene resin is made with a bimetallic supported polymerization catalyst comprising a metallocene transition metal compound, and wherein the polyethylene resin contains a catalyst residue and thus contains up to 20 ppm of transition metal provided by said metallocene transition metal compound.

* * * * *